Aug. 2, 1938.  A. SOMMER  2,125,860
PROCESS AND APPARATUS FOR PRODUCING A PULVERULENT BUILDING MATERIAL
Filed March 24, 1937  2 Sheets-Sheet 2
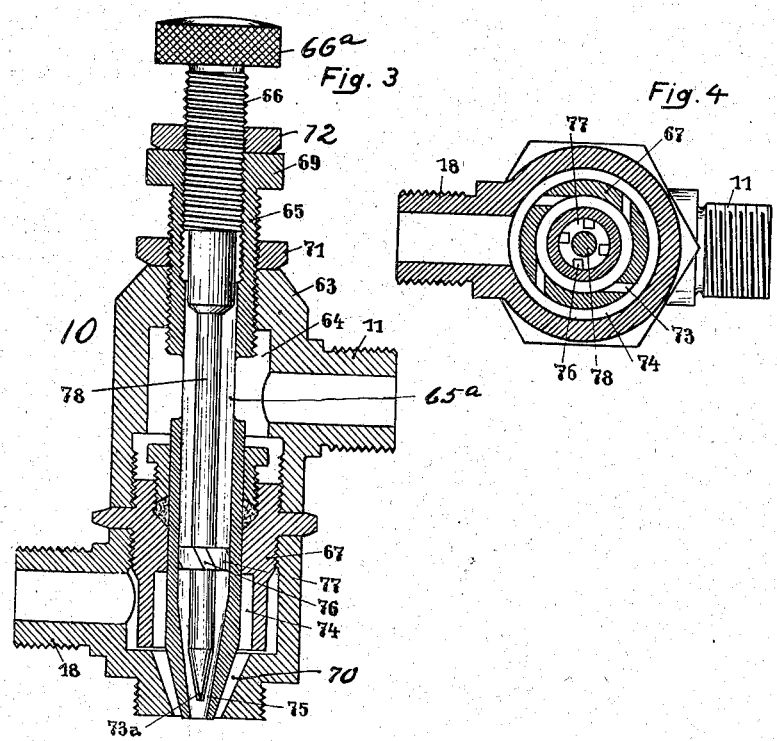
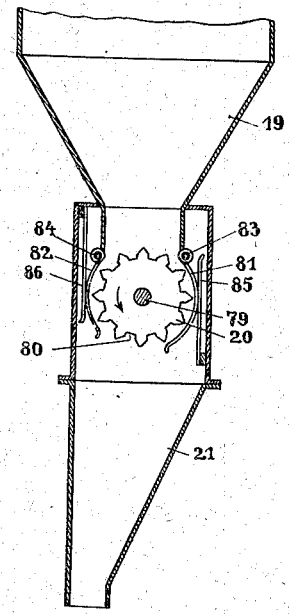
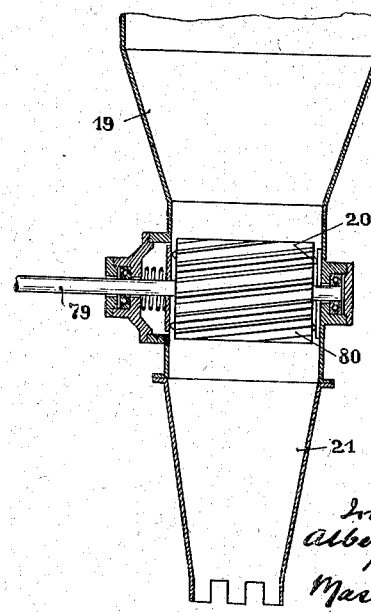

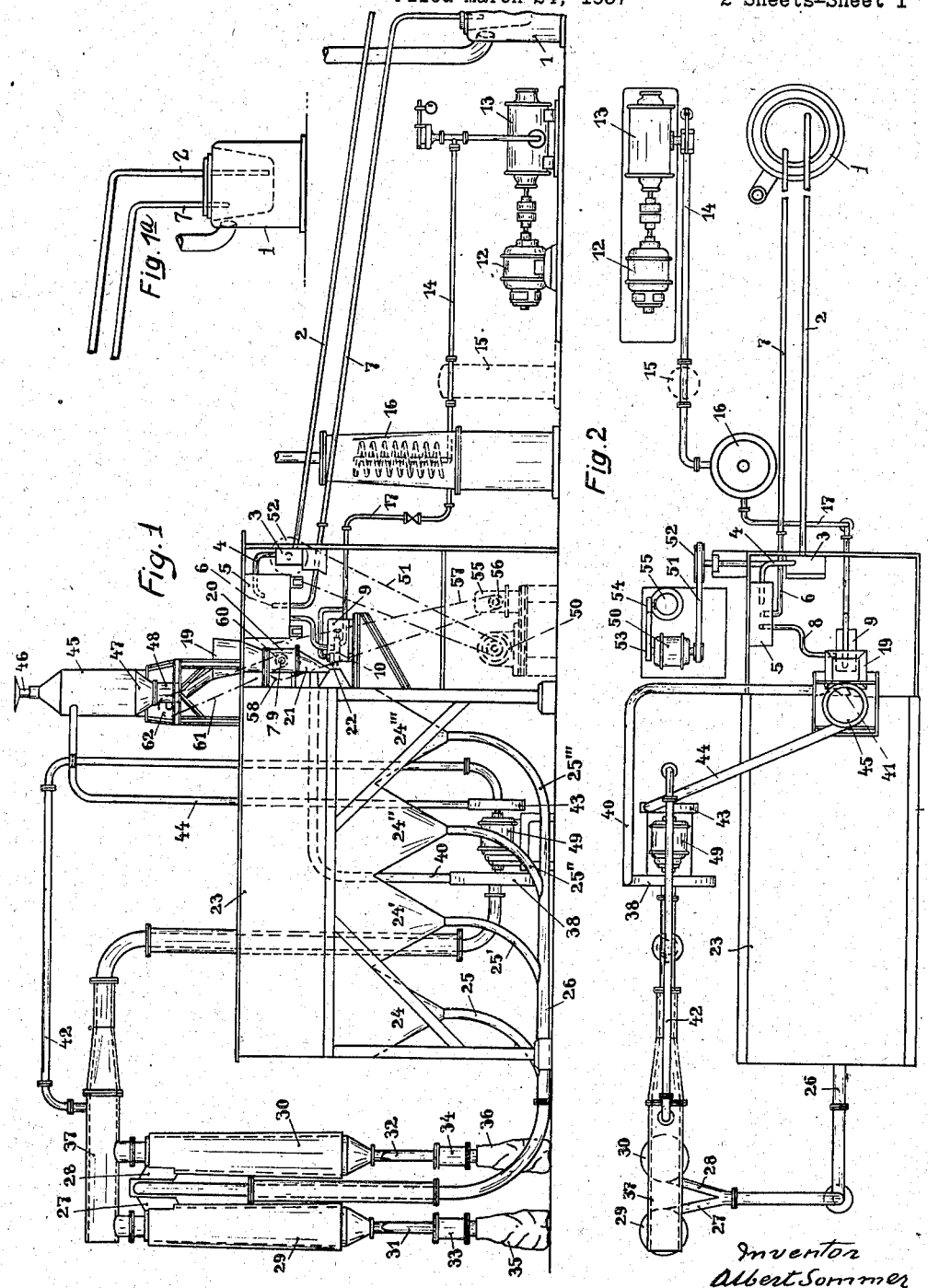

Patented Aug. 2, 1938

2,125,860

UNITED STATES PATENT OFFICE 2,125,860

PROCESS AND APPARATUS FOR PRODUCING A PULVERULENT BUILDING MATERIAL

Albert Sommer, Zurich, Switzerland, assignor to the firm "Straba" Strassenbaubedarfs-Aktiengesellschaft, Zurich, Switzerland Application March 24, 1937, Serial No. 132,729
In Germany July 25, 1936

14 Claims. (Cl. 94—43)

The present invention relates to a process and apparatus for producing a pulverulent building material from a mixture of clouds or mists formed by atomization of pulverulent and fluid or liquefied constituents.

According to my own atomization process described in my Reissue Patent #20,119, a pulverulent constituent is atomized in a mixing chamber in form of a mist or cloud and mixed with a mist or cloud of fluid or liquefied constituents, the particles of the different constituents being thereby caused to settle on one another, as a result of which a pulverulent mixture is obtained as final product.

To utilize the process for bituminizing a filler (i. e., a pulverulent or fine grain mineral substance) to be adapted for building purposes, particularly for road construction, a relatively large quantity of liquefied constituent, such as bitumen, must be incorporated in the pulverulent mineral substance. This I found entails difficulties, since the liquefied constituent has the tendency to form lumps when precipitated immediately after mixing.

This invention, therefore, has for its object to provide a process and means which will obviate these difficulties and whereby it will be possible to more effectively utilize my atomization process in instances when relatively high percentages of fluid or liquefied constituents are employed. This is accomplished by directing a current of air onto the atomized particles while in a state of suspension, which is adapted to grip the aggregates of the mixture at the point of their injection and to carry the mixture through centrifugal dust separators.

This current of air may, when necessary, be cooled, so as to cool the aggregates during the mixing action. In this manner the particles of the mixture before they have time to settle down, are held in suspension and cooled by the air current, preferably produced by suction, long enough to lose their stickiness and are thereby prevented from conglomerating, rendering the mixture perfectly fit for storing until put to use, when, by pressure, heating or otherwise, the binding property of the mixture can be restored.

To carry out my new process I employ an apparatus which in principle is known but which for the purposes of the present invention has certain novel features.

With the known apparatuses of this kind the pulverulent substance is injected by a nozzle into a mixing chamber by compressed air, whereby it is atomized into the form of a mist or cloud. At the same time fluid or liquefied substances are similarly atomized in the mixing chamber, wherein the different clouds are caused to become intimately mixed with one another, and from which the final mixture, after settling down in the chamber, is dropped out through the openings in the bottom of the mixing chamber.

According to this invention, my apparatus comprises in addition to the means hereinbefore mentioned, controllable inlet passages for the substances to be atomized, and means whereby an air current is caused to grip the mixture to hold the particles thereof in a state of suspension, and to carry off said mixture through suitable centrifugal dust separators in which it is separated from the air.

The apparatus also comprises suitable cooling means whereby the mixture may be cooled during the mixing period and other improvements which will be more fully described hereinafter.

In the accompanying drawings which form part of this specification and in which similar reference characters denote corresponding parts:

Fig. 1 is a diagrammatic elevation of one embodiment of the apparatus used for carrying out my process;

Fig. 1a is a diagrammatic showing of the bitumen heater and pipes;

Fig. 2 is a top plan view thereof;

Fig. 3 is an enlarged sectional elevation of the bitumen atomizing nozzle;

Fig. 4 is a cross section thereof;

Fig. 5 is a vertical section of a feeding device for the pulverulent constituents; and Fig. 6 is a vertical section thereof at a right angle to Fig. 5.

I denotes a bitumen heater from which leads a pipe 2 into a bitumen pump 3. From the latter the bitumen is conveyed through a pipe 4 to an intermediate receptacle 5 in which, as will be presently described, through a circulating system the bitumen is maintained at constant temperature. Leading from this receptacle is an overflow pipe 6 which is connected to a return pipe 7 leading into the heater 1. Contrary to the hitherto known construction, the intermediate receptacle is arranged at a higher elevation than the injection nozzle, so that the bitumen may flow by its own gravity into the nozzle, instead of, as hitherto, being forced down by compressed air which often causes disturbances.

A pipe 8 leads from the intermediate receptacle 5 into the bitumen atomizing nozzle 10 carried by the nozzle casing 9. This pipe 8 is connected to a mouthpiece 11 of the bitumen atomizing nozzle 10, as will be hereinafter more fully described. 12 is a motor which serves to drive an air compressor 13. An air tube 14 leads from compressor 13 through an oil separator 15 into the air heater 16 and a tube 17 leads from said air heater 16 into the nozzle casing 9 and is connected to the mouthpiece 18 of said bitumen atomizing nozzle 10.

The bitumen is sucked up by means of pump 3 from the bitumen heater 1 through pipe 2 and led into the intermediary receptacle 5 through pipe 4. A portion of the bitumen flows through the overflow pipe 6 and the return pipe 7 back into the bitumen heater 1, while another portion thereof flows through pipe 8 to the nozzle 10 in which the atomization is effected.

By using the overflow pipe 6 and the return pipe 7, not only is a continuous circulation of the bitumen afforded, but both the temperature of the latter and the pressure with which it is discharged from the receptacle 5 are held constant.

By preheating the air in the air heater 16 the atomization of the bitumen is greatly enhanced.

The pulverulent constituent is charged into a funnel-shaped receptacle 19 at the lower end of which is provided a feeder 20, the construction and operation of which will be hereinafter fully described and whereby the pulverulent constituent is uniformly fed into a funnel-shaped receptacle 21 mounted below the same, to be passed therefrom to the compressed air nozzle 22. One or more compressed air nozzles 22 carried by the nozzle casing 9 are adapted to atomize the pulverulent constituents discharged from the receptacle 21. The nozzles 10 and 22 for the bitumen and pulverulent substances, respectively, are spaced according to the requirements so that the atoms or minute particles of the atomized pulverulent and bituminous substances become intimately mixed, or settle upon one another. This mixing action also continues in the chamber 23. At the bottom of said chamber are provided a number of suction funnels 24, 24', 24'', 24''', from which lead suction pipes 25, 25', 25'', 25''', into a common pipe 26, which latter communicates through passages 27, 28, with centrifugal or similar dust separators 29, 30, of well known construction.

In the present example two dust separators are provided, although the number is optional, depending upon the size of the plant. In these dust separators the air is separated, in well known manner, from the dust particles of the mixture and the latter allowed to sink to and accumulate at the bottom, from which the mixture, through pipes 31, 32, and sluices 33, 34, is discharged into bags 35, 36 (Fig. 1). The separation of the mixture particles from the air cannot be effectively accomplished by means of filters or like separators because of the tendency of the particles to clog therein. Nor are electric separators practical because of the relatively high cost thereof. I have found that the well known centrifugal dust separators are most advantageous for the purpose of this process.

The dust separators 29 and 30 may be jacketed for cooling purposes so that the air circulating therethrough may be effectively cooled.

The air freed from the particles of the mixture enters the conduit 37 communicating with the upper ends of the separators 29 and 30 and which conduit may also be jacketed for cooling purposes. This conduit 37 is connected to the suction end of a blower 38 which is adapted to suck up the air and return it to the chamber 23 through a pipe 40 which too may be suitably cooled. This pipe terminates in the mixing chamber 23 at 41 (Fig. 2) close to the point at which the constituents are atomized by their respective nozzles, so that the current of cooled air strongly agitates the clouds. Branching off the conduit 37 is a pipe 42 which communicates with the suction end of a second blower 43 by which the sucked up air is forced through a pipe 44 into another dust separator 45. From the latter the air is then allowed to pass out through an outlet 46. Such particles of the mixture that may still be present in the air are discharged from said separator 47 through a sluice 48 into the funnel 19 receiving the pulverulent constituent.

A motor 49 drives the blowers 38 and 43. A motor 50 drives the pump 3 through belt 51 and pulley 52. The motor 50 is operatively connected by belt 53 and pulley 54 to a differential gearing 55, which by sprocket gear 56, chain 57 and sprocket gear 58 drives the feeder 20. The shaft 79 of said feeder carries another gear 60, which by chain 61 and sprocket wheel 62 operates the sluice 48.

The construction of the bitumen atomizing nozzle 10 is shown in detail in Figs. 3 and 4.

This nozzle substantially comprises a cylindrical casing 63 provided with an inlet mouthpiece 11 for the admission of bitumen, and an inlet mouthpiece 18 for the admission of compressed air. Extending longitudinally through said casing is a tubular body 65 in which is borne the needle valve 66 of the nozzle. This tubular body 65 is threadedly mounted in a threaded bore provided at the upper end of said casing. The lower end of said body 65 projects through the lower open end of the casing 63. Mounted around the body 65 between mouthpieces 11 and 18 is a cup-shaped body 67 carrying suitable packing means. The upper end of the body 65 is provided with a headpiece or flange 69 by means of which the same can be screwed up or down within the casing 63, so that, by an adjustment of the annular cross sectional area of the space 70 provided between the lower end of the casing 63 and that of the tubular body 65, the discharge of air may be controlled. The body 65 can be secured in position within the casing 63 by a nut 71 working on the threaded end of the body 65. The latter is also provided longitudinally with internal thread in which works the needle valve 66 of the nozzle, which thus can be raised and lowered to vary the annular space 75 between the conical tip 73ᵃ of the needle valve 66 and the conical inner wall of body 65. Thus, by adjusting the needle valve 66 longitudinally, the size of the opening through which the bitumen is discharged can be varied. The needle valve 66 is provided with a serrated head or knob 66ᵃ whereby it can be manipulated. Working on said needle is a nut 72 for tightening the same in adjusted position.

The packing cup 67 is provided with a plurality of narrow slits 73 extending tangentially relative to the annular channel 74 formed between the body 65 and the walls of the cup 67. The compressed air entering through mouthpiece 18 passes through the slits 73 provided in said cup 67 into the annular channel 74 (Fig. 4) and thence to the annular discharge passage 70 which surrounds the bitumen discharge passage 75. The slits being arranged tangentially relative to channel 74 impart to the current a whirling motion, thereby enhancing the atomization of the bitumen.

The bitumen admitted through the mouthpiece 11 enters through openings 65ᵃ the tubular body 65. The needle valve 66 is provided at its lower part with a plunger-like shoulder 77 in which are formed slots 76 leading into the discharge chamber 75. These slots 76, as will be seen, are biased so as to impart to the bitumen as it is being discharged a twisting motion. The plunger-shaped shoulder 77 also serves to properly guide the relatively long stem 78 of the needle valve 66 in the tube 65.

In order to keep the charge of the pulverulent constituent always constant, the funnel 19 into which the pulverulent constituent is charged is provided at its lower end with a distributing cylinder 20 provided circumferentially with a number of longitudinally biased channels 80. Laterally of said cylinder 20 are provided guards 81, 82, hinged to the bottom of said funnel 19 and which are adapted to be pressed against said cylinder 20 by springs 85, 86. The pulverulent material dropping into the channels 80 will be carried along with the cylinder 20 when the latter is rotated and prevented from leaving said channels as long as the latter are within the range of the guards 81, 82. These channels are so arranged on the cylinder 20 that the channels will empty successively one after the other. By the particular arrangement of the channels and guards (Fig. 6) a gradual discharge of the material from the drum can be effected. It is obvious that instead of slanting the channels 80 on the drum, as shown, the lower edges of the guard members may be slanted.

The air capacity of the auxiliary circulating system 42, 43 and 44 is so chosen, that the volume of air withdrawn from the main circulating system is about equivalent to the volume of injected compressed air.

It is clear that various changes may be made in the construction of the apparatus for carrying out my new process without departing from the principle of my invention. I, therefore, do not wish to restrict myself to the details of the construction described and shown.

What I claim is:—

1. A process of producing a pulverulent building material from pulverulent and fluid or liquefied base constituents, consisting in the atomization in a mixing chamber of each of said constituents separately and simultaneously into mists or clouds, impinging upon the atomized particles near the point of their injection into said chamber while still in a state of suspension a cool air current and carrying the mixture through dust separators.

2. A process according to claim 1, in which the mixture is subjected to the action of a suction produced circulating air current.

3. A process according to claim 1, in which the air freed from dust particles of said mixture in said dust separators is passed back into the mixing chamber to act on the constituents at the point of their injection.

4. In a process according to claim 1, in which the atomization of said bituminous substance is enhanced by imparting to said substance and the compressed air acting thereon twisting or whirling motions.

5. In an apparatus for producing a pulverulent building material from a pulverulent constituent and fluid or liquefied constituents, the combination with a mixing chamber and means for atomizing said constituents in said chamber, of controllable means for feeding the said constituents toward said atomized means, means for producing a current of cool air in said mixing chamber to impinge upon the atomized constituents at the point of their atomization and while in a state of suspension and means for separating said mixture from the current of air.

6. An apparatus according to claim 5, in which the controllable means for feeding the pulverulent material includes a revolving cylinder having channels to receive said material and means for causing a gradual uniform discharge of said material from said channels while said drum is rotated.

7. In an apparatus of the character described, means for atomizing a bituminous substance, including a heater for said substance, a pump, an auxiliary receptacle arranged above the level of said atomizing means, an overflow leading from said receptacle to said atomizing means and a return conduit leading from said receptacle into said pump, whereby said substance is caused to circulate through said receptacle to maintain the molten substance in said receptacle at constant level and temperature.

8. In an apparatus according to claim 5, in which suction means communicate with said mixing chamber and lead into said mixture separating means.

9. In an apparatus according to claim 5, in which said mixture separating means include dust separators, a suction effected air circulating system, including means for carrying said mixture from said mixing chamber into said separators, and means for returning the air from said separators into said mixing chamber.

10. In an apparatus according to claim 5, in which is provided an auxiliary suction effected air circulating system, including an auxiliary dust separator having an air discharge, auxiliary suction creating means and means for carrying a portion of the air with the residue of dust particles into said auxiliary dust separator and means for discharging said dust particles into the atomizing means, the air withdrawal capacity of said auxiliary circulating system being about equivalent to the volume of compressed air injected into said mixing chamber.

11. In an apparatus of the character described, an atomizing nozzle for a fluid or liquefied substance comprising a casing formed with separate mouthpieces for the admission of said substance and compressed air, an adjustable tubular body extending through said casing and an adjustable needle valve extending through said tubular body, the mouthpiece for said substance leading into a discharge channel formed between said needle valve and said tubular body, and the mouthpiece for said compressed air leading into a discharge channel formed between said tubular body and said casing.

12. In an apparatus according to claim 11, in which means for feeding said fluid or liquefied substance from its said mouthpiece into its discharge channel are provided which include slanting ducts adapted to impart to said substance a twisting motion.

13. In an apparatus according to claim 11, in which means for feeding the compressed air from its mouthpiece into its discharge channel are provided which include ducts extending tangentially relative to said channel and adapted to impart to said air a whirling or cyclonic motion.

14. In an apparatus according to claim 11, in which packing means are provided in said casing comprising an adjustable cup formed with ducts extending tangentially relative to the compressed air discharge channel adapted to impart to said air a whirling or cyclonic motion.

ALBERT SOMMER.